United States Patent
Wright et al.

(10) Patent No.: US 7,103,049 B2
(45) Date of Patent: Sep. 5, 2006

(54) MECHANISM FOR PROVIDING OCTET ALIGNMENT IN SERIAL ATM DATA STREAM

(75) Inventors: Jonathan Aaron Wright, Huntsville, AL (US); Christopher A. Otto, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 947 days.

(21) Appl. No.: 10/040,153

(22) Filed: Jan. 2, 2002

(65) Prior Publication Data

US 2003/0123450 A1 Jul. 3, 2003

(51) Int. Cl.
*H04L 12/56* (2006.01)
(52) U.S. Cl. .............. 370/395.1; 370/395.62
(58) Field of Classification Search ............ 370/395.1, 370/395.21, 395.51, 395.3, 395.5, 395.6, 370/476, 507–510, 514
See application file for complete search history.

(56) References Cited

U.S. PATENT DOCUMENTS 6,665,308 B1 * 12/2003 Rakib et al. ............... 370/441
2001/0033575 A1 * 10/2001 Shimamura et al. ........ 370/419
2001/0046266 A1 * 11/2001 Rakib et al. ............... 375/259
2001/0053157 A1 * 12/2001 Li ............................. 370/466
2002/0009087 A1 * 1/2002 Ganmukhi et al. ...... 370/395.7
2002/0015423 A1 * 2/2002 Rakib et al. ............... 370/485

* cited by examiner

*Primary Examiner*—Ricky Q. Ngo
*Assistant Examiner*—Jonathan Liou
(74) *Attorney, Agent, or Firm*—Allen, Dyer, Doppelt Milbrath & Gilchrist, P.A.

(57) ABSTRACT

A byte boundary information recovery mechanism locates the first bits of respective bytes of an asynchronous transfer mode (ATM)-based serial data stream, used by a frame synchronization mechanism to delineate respective cells of the ATM stream, and thereby enables transceiver equipment to successfully receive and parse ATM traffic. The invention employs a counter offset-based scheme that generates an output signal in potential alignment with the (first bit) boundary of a byte of the data stream, in response to the contents of a counter reaching a prescribed count value. It then iteratively shifts, as necessary, the bit time at which the output signal is produced relative to the counting operation of the counter, until the output signal is aligned with the boundary of a byte of the data stream.

16 Claims, 1 Drawing Sheet

MECHANISM FOR PROVIDING OCTET ALIGNMENT IN SERIAL ATM DATA STREAM

FIELD OF THE INVENTION

The present invention relates in general to communication systems and subsystems therefor, and is particularly directed to a bit clock count offset-based mechanism for locating the beginning (initial bits) of respective octet or bytes of a serial data stream, so as to enable an associated cell delineation device to delineate respective cells of the serial data stream.

BACKGROUND OF THE INVENTION

The ability to conduct high-speed data communications between remotely separated data processing systems and associated subsystems has become a requirement of a variety of industries and applications, such as business, educational, medical, financial and personal computer uses. Moreover, it can be expected that current and future applications of such communications will continue to engender more such systems and services. One technology that has attracted particular interest in the telecommunication community is digital subscriber line (DSL) service. DSL technology enables a public service telephone network (PSTN) to use existing telephone copper wiring infrastructure to deliver a relatively high data bandwidth digital communication service, that is selected in accordance with expected data transmission rate, the type and length of data transport medium, and schemes for encoding and decoding data.

FIG. 1 is a reduced complexity diagram of the general architecture of a DSL system, having a pair of mutually compatible digital communication transceivers 1 and 3 installed at remotely separated 'west' and 'east' sites 2 and 4, respectively, and coupled to a communication link 10, such as a twisted pair of an existing copper plant. One of these transceivers, for example, the west site transceiver 1, may be installed in a digital subscriber line access multiplexer (DSLAM) 6 of a network controller site (such as a telephone company central office (CO)). The DSLAM is coupled with an associated network backbone 5 that provides access to information sources 7 and Internet-sourced data 8. As such, the west site transceiver 1 is used for the transport of digital communication signals, such as asynchronous transfer mode (ATM)-based serialized data, from the west central office site 2 over the communication link 10 to the DSL transceiver 3 at the east end of the link. The DSL transceiver 3 may be coupled with a computer 9 at a customer premises, such as a home or office.

In order to delineate respective cells of a received asynchronous transfer mode (ATM)-based serial data stream, transceivers of digital communication networks, such as the transceivers 1 and 2 in the system of FIG. 1, are often equipped with a mechanism that relies upon a priori knowledge of the boundaries (e.g., beginning) of respective bytes of an incoming serial (ATM) data stream. Unfortunately, some wide area network interface devices provide no information concerning the start of payload or start of respective octets, making it impossible for the transceiver equipment to successfully receive and parse ATM traffic.

SUMMARY OF THE INVENTION

In accordance with the present invention, this lack of octet or byte boundary information problem is successfully resolved by a bit count offset-based arrangement, that is operative to locate the beginning (initial bits) of respective octet or bytes of a serial (ATM) data stream, and thereby enable an associated byte boundary-based cell device to delineate the respective ATM cells of the data stream, so that the data stream may be recovered. In each of first and second embodiments, a programmable counter counts prescribed transitions in a bit clock associated with the bit times of the received signal.

In the first embodiment, the counter is implemented as an up-counter and is initially preloaded by the receiver's microcontroller with a programmable value of zero. The contents of the counter are monitored by a logic circuit, which changes state and produces an output frame sync signal FS, upon the counter having counted up from its preloaded value up to a prescribed value (e.g., a value of N*8, where N is arbitrary and application dependent). The frame sync FS output of the logic circuit is monitored by the receiver's cell delineation mechanism for the purpose of controlling value to be preloaded into the counter, and thereby the number of clock signals to be counted by the counter in order for the logic circuit to produce an output FS signal. In addition to being monitored by the cell delineation mechanism, the frame sync signal is fed back to reset or clear the contents of the counter to zero.

If cell delineation is not achieved within a prescribed cell delineation acquisition window or interval, such as after counting a prescribed number of FS signals produced by the logic circuit, the control processor causes a value of '1' to be pre-loaded into the counter, so that the counter needs to count only (N*8)−1 (e.g., 255) clock signals before the logic circuit produces the next frame sync output signal FS. When the next produced FS signal is fed back to clear the contents of the counter to zero, the counter will begin counting again from a starting value of '0', and repetitively count clock signals. If cell delineation is not achieved for the next window, the control processor will once again preload a '1' into the counter.

This repetitive selective modification of the start value of the counter serves to successively shift the frame sync signal by one bit time (earlier), on a periodic basis, causing the cell delineation mechanism to use the previous bit in time as a new start-of-octet location. Eventually, after some number of such one-bit shifts, cell delineation will be achieved, which terminates any additional preloading of the counter with a value other than zero.

The counter of the second embodiment is used to generate an 'intermediate' frame sync signal $FS_0$ every N*8 bit times, where N is arbitrary and application-dependent. However, unlike the first embodiment, the counter is not periodically pre-loaded with a selected value, to cause a one-bit count shift, based upon whether cell delineation has been achieved within a repetitive acquisition window. Instead, the counter of the second embodiment counts input clock signals and, upon reaching a prescribed count value (e.g., a maximum value of 256 for an eight bit counter), rolls over and begins again counting the input clock signals.

Each intermediate frame signal $FS_0$ produced by counter roll-over is clocked into and through a first-in, first-out shift register or FIFO, such as an eight bit shift register. Successive stages of the shift register are coupled in parallel as inputs to a multiplexer, the output of which provides the frame signal FS. The contents of the shift register are successively shifted therethrough under the control of the input clock signal being counted by the counter. The steering path through the multiplexer is controlled by the microcontroller. Since the intermediate frame sync signal $FS_0$ is clocked through the shift register under the control of the input clock signal being counted by the counter, then each successive stage of the FIFO effectively provides a one-bit time offset relative to the immediately previous stage. As a result, the time of occurrence of the frame sync signal FS will depend upon which stage of the shift register is coupled through the multiplexer. As in the first embodiment, the frame sync signal FS produced by the multiplexer is continuously monitored by the receiver's cell delineation mechanism.

At the start of the operation of the bit count offset-based cell delineation control scheme of the second embodiment, the control processor causes the steering path through the multiplexer to couple the contents of the first stage of the shift register to the multiplexer output, thereby effecting a zero bit delay of the frame sync signal FS relative to the intermediate frame sync signal $FS_0$. If the receiver's cell delineation mechanism achieves cell delineation within a prescribed cell delineation acquisition window, such as after counting a prescribed number of FS signals, the control processor maintains the output of the first stage of the FIFO coupled to multiplexer. However, if the receiver's cell delineation mechanism does not achieve cell delineation within a prescribed cell delineation acquisition window, the control processor changes the state of the control input to the multiplexer for the next succeeding frame sync count period. This serves to sequentially 'step' the input path to the multiplexer from the first FIFO stage to the second FIFO stage, thereby providing a one-bit time delay or shift of the frame sync signal FS relative to the intermediate frame sync signal $FS_0$.

If cell delineation is then achieved within the cell delineation acquisition window, the control processor thereafter maintains the output of the second stage of the FIFO coupled to the multiplexer. On the other hand, if cell delineation is not achieved within the cell delineation acquisition window, the control processor will again change the state of the control input to the multiplexer for the next succeeding frame sync count period so as to step to the next stage of the FIFO.

This repetitive multiplexer-to-FIFO stage stepping operation is repetitively carried out, through successive stages of the FIFO, and wrapping around or rotating back to the first stage, as necessary, for repetitive acquisition windows, until cell delineation is achieved. At each iterative step, the next stage of the shift register serves to shift the frame sync signal by one bit time, causing the cell delineation mechanism to use a slightly delayed in time at a new start-of-octet location. Eventually, after some number of such one-bit shifts, cell delineation will be achieved, terminating any further shifting of the signal flow path through the multiplexer.

DETAILED DESCRIPTION

Figure 1:
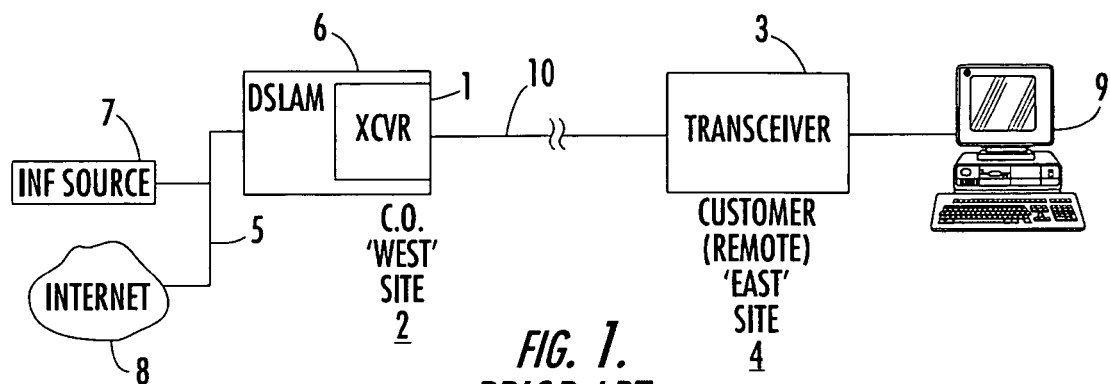
FIG. 1 is a reduced complexity diagram of the general architecture of a DSL telecommunication system.

Before detailing the bit count offset-based octet location mechanism of the present invention, it should be observed that the invention resides primarily in a prescribed arrangement of conventional communication hardware components and attendant supervisory communications microprocessor circuitry and application software therefor, that controls the operations of such components. In a practical implementation that facilitates their incorporation into telecommunication transceiver equipment (such as that which may be installed at a central office or customer premises), the inventive arrangement may be readily implemented using a general purpose digital computer, or field programmable gate array (FPGA)-configured, application specific integrated circuit (ASIC) chip sets. In terms of a practical hardware implementation of such chip sets, digital ASICs are preferred.

Consequently, the configuration of such subsystems and components and the manner in which they may be interfaced with a telecommunication wireline pair have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagrams of the Figures are primarily intended to show the major components of the invention in convenient functional groupings, whereby the present invention may be more readily understood.

Figure 2:
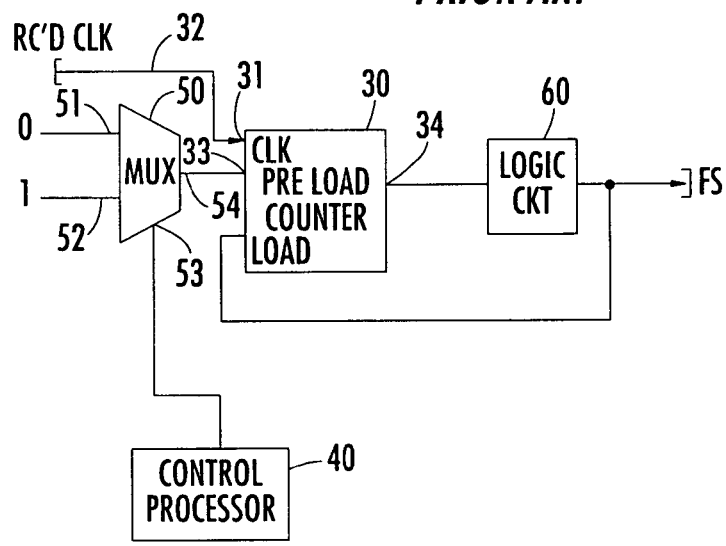
FIG. 2 diagrammatically illustrates a first embodiment of the bit count offset-based octet location mechanism of the present invention.

Attention is now directed to FIG. 2, wherein a first embodiment of the bit count offset-based octet location mechanism of the present invention is diagrammatically shown as comprising a programmable counter 30, that is operative to count prescribed transitions in a serialized input signal applied to an input 31 thereof, and generate an output signal upon reaching a prescribed roll-over count value. The counter may operate either as an up-counter or a down-counter, without a loss in generality. In the present example, counter 30 operates as an up-counter, being preloaded with a programmable value of one or a value of zero, under control of the receiver's micro-controller 40.

Figure 3:
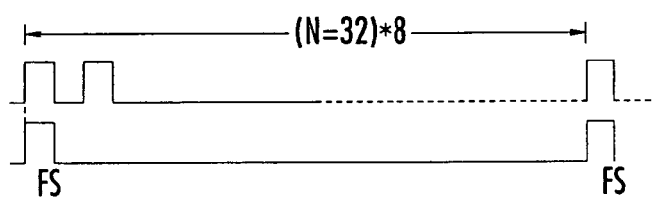
FIG. 3 is a timing diagram showing a frame sync signal (FS) occurring every N*8 bits in a serialized pulse signal stream.

As described above, the cell delineation mechanism employed by the receiver's micro-controller relies upon a priori knowledge of the boundaries of respective bytes of an incoming serial data stream. For purposes of providing a non-limiting example, the serialized input signal applied to the counter 30 may comprise a recovered clock signal derived from a digital data stream, having a prescribed frame synchronization signal (bit), that occurs at some multiple of signal groups or sets, such as every N number of octets or bytes. As shown in the timing diagram of FIG. 3, in the present example, a frame sync signal (FS) may occur very (N=32)*8 or every 256 bits or clock signals in a serialized pulse signal stream 32.

For this set of parameters, the receiver's micro-controller 40 is operative to selectively pre-load the counter 30 with a prescribed length code (e.g., an eight bit code) having either a value of zero (0000 0000) or one (0000 0001), depending upon whether cell delineation has been achieved within a periodically repetitive acquisition window. To this end, a multiplexer 50 has a first input 51 coupled to receive a first code, such as the eight bit code 0000 0000, and a second input 52 coupled to receive a second code, such as the eight bit code 0000 0001. The steering path through the multiplexer 50 is controlled by a one-bit control signal (0/1) applied to control input 53 from micro-controller 40.

The multiplexer output 54 is coupled to a pre-load input 33 of the up-counter 30. The output 34 of the counter 30 is coupled to a logic circuit 60, which changes state and produces an output frame sync signal FS, upon the counter 30 having counted up from its preloaded value (zero or one) up to a prescribed value (a value of 256 in the present example). The frame sync FS output of the logic circuit 60 is monitored by the receiver's cell delineation mechanism for the purpose of controlling the steering path through the multiplexer 50, and thereby the number of clock signals to be counted by counter 30 in order the for logic circuit 60 to produce an output FS signal.

More particularly, at the start of the operation of the bit count offset-based cell delineation control scheme of the first embodiment, the control processor 40 causes the steering path through the multiplexer 30 to pre-load a value of '0' into the up-counter 30. Thereafter, as successive recovered clock signals are counted by counter 30, its contents are sequentially incremented, until the logic circuit 60 detects that the contents of counter 30 have reached a prescribed (N*8) count value—a value of 256 in the present example—whereupon a frame sync signal FS is produced. In addition to being monitored by the cell delineation mechanism, the frame sync signal is fed back to the load input (LOAD) of the counter 30, and the process is repeated with counter 30 beginning its count from a starting value of '0' up to '256'.

If the receiver's cell delineation mechanism does not achieve cell delineation within a prescribed cell delineation acquisition window, such as after counting a prescribed number of FS signals produced by the logic circuit 60, the control processor 40 changes the state of the control input 53 to the multiplexer 50 for the next succeeding frame sync count period. This causes a value of '1' to be pre-loaded into the counter 30. Having been preloaded with a value of '1', counter 30 now needs to count only 255 clock signals before logic circuit 60 produces the next frame sync output signal FS. Since this FS signal is fed back to the LOAD input of the counter 30, counter 30 will again begin counting from a starting value of '0', and repetitively count clock signals, as described above.

Again, if cell delineation is not achieved within a prescribed cell delineation acquisition window, the control processor 40 will again change the state of the control input 53 to the multiplexer 50 for the next succeeding frame sync count period. This repetitive selective modification of the start value of counter 30 effectively shifts the frame sync signal by one bit time earlier, on a periodic basis, causing the cell delineation mechanism to use the previous bit in time as a new start-of-octet location. Eventually, after some number of such one-bit shifts, cell delineation will be achieved, which terminates any additional preloading of the counter with a value other than zero.

Figure 4:
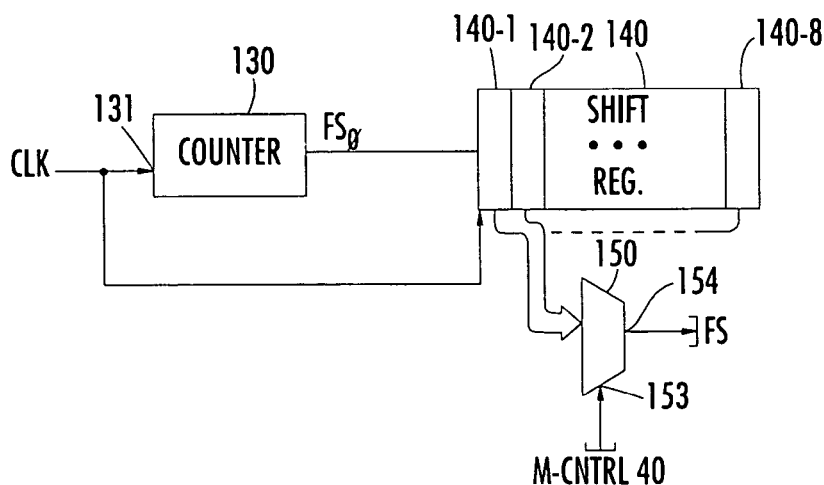
FIG. 4 diagrammatically illustrates a second embodiment of the bit count offset-based octet location mechanism of the present invention.

A second embodiment of the bit count offset-based octet location mechanism of the present invention, shown in FIG. 4, is similar to the first embodiment described above, having a counter 130 that counts prescribed transitions in the serialized input signal stream applied to an input 131 thereof. Counter 130 is used to generate an 'intermediate' frame sync signal $FS_0$ every N*8 bit times, where N is arbitrary and application-dependent. Unlike the first embodiment, counter 130 is not periodically controllably pre-loaded with a selected value, as necessary, to cause a one-bit count shift, based upon whether cell delineation has been achieved within a repetitive acquisition window. Instead, the counter 130 counts input clock signals and, upon reaching a prescribed count value (e.g., a maximum value of 256 for an eight bit counter), rolls over and begins again counting the input clock signals.

Each intermediate frame signal $FS_0$ produced by counter roll-over is clocked into and through a first-in, first-out shift register or FIFO, such as an eight bit shift register 140. Successive stages 140-1, . . . 140-8 of the shift register 140 are coupled in parallel as inputs $F_1$–$F_8$ to an 8:1 multiplexer 150, whose output 153 provides the frame signal FS. The contents of the shift register 140 are successively shifted under the control of the input clock signal being counted by the counter 130. The steering path through the multiplexer 150 is controlled by a control code (e.g., a three bit control code in the case of an eight bit FIFO of the present example) applied to its control input 153 from the micro-controller 40. The multiplexer output 154 serves as the frame sync signal FS.

Since the intermediate frame sync signal $FS_0$ is clocked through the shift register 140 under the control of the input clock signal being counted by the counter 130, then each successive stage of the FIFO 140 effectively provides a one-bit time offset relative to the immediately previous stage. Consequently, the time of occurrence of the frame sync signal FS will depend upon which stage of the shift register 140 is coupled through the multiplexer 150.

For this purpose, as in the first embodiment, the frame sync signal FS (here, produced by the multiplexer 150) is continuously monitored by the receiver's cell delineation mechanism. At the start of the operation of the bit count offset-based cell delineation control scheme of the second embodiment of FIG. 4, control input to the multiplexer from the control processor 40 is such that the path through the multiplexer 150 couples the contents of the first stage 140-1 of the shift register 140 to the multiplexer output 154, thereby effecting a zero bit offset or delay of the frame sync signal FS relative to the intermediate frame sync signal $FS_0$.

If the receiver's cell delineation mechanism achieves cell delineation within a prescribed cell delineation acquisition window, such as after counting a prescribed number of FS signals, the control processor maintains the output of the first stage 140-1 of FIFO coupled to multiplexer 150. However, if the receiver's cell delineation mechanism does not achieve cell delineation within a prescribed cell delineation acquisition window, the control processor 40 changes the state of the control input 153 to the multiplexer 150 for the next succeeding frame sync count period.

This serves to sequentially 'step' the input path to the multiplexer 150 from the first FIFO stage 140-1 to the second FIFO stage 140-2, thereby providing a one-bit time delay or shift of the frame sync signal FS relative to the intermediate frame sync signal $FS_0$. If the receiver's cell delineation mechanism achieves cell delineation within the cell delineation acquisition window, the control processor thereafter maintains the output of the second stage 140-2 of FIFO coupled to multiplexer 150.

On the other hand, if the receiver's cell delineation mechanism does not achieve cell delineation within the cell delineation acquisition window, the control processor 40 will again change the state of the control input 153 to the multiplexer 150 for the next succeeding frame sync count period so as to step to the next stage 140-3 of the FIFO 140.

This repetitive multiplexer-to-FIFO stage stepping operation is repetitively carried out, through successive stages 140-1, . . . , 140-N of the FIFO, one stage at a time, and wrapping around or rotating back to the first stage 140-1, as necessary, for repetitive acquisition windows, until bit delineation is achieved. At each iterative step, the next stage 140-i of the shift register 140 serves to shift the frame sync signal by one bit time, causing the cell delineation mechanism to use a slightly delayed in time at a new start-of-octet location. After some number of such one-bit shifts, cell delineation will be achieved, which terminates any further shifting of the signal flow path through the multiplexer.

As will be appreciated from the foregoing description, the failure of some wide area network interface devices to provide byte boundary information from that would otherwise enable a frame synchronization mechanism to delineate respective cells of a received asynchronous transfer mode (ATM)-based serial data stream, so that transceiver equipment can successfully receive and parse ATM traffic, is successfully addressed in accordance with the present invention, by means of a counter offset-based mechanism. This mechanism generates an output signal in potential alignment with the boundary of a byte of the data stream, in response to contents of a counter reaching a prescribed count value; it then iteratively shifts, as necessary, the bit time at which the output signal is produced relative to the counting operation of the counter, until the output signal is aligned with the boundary of a byte of the data stream.

While we have shown and described several embodiments in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. For use with a receiver of a digital communication system, said receiver having a cell delineation mechanism that is operative, given knowledge of boundaries of respective bytes of an incoming serial data stream, to delineate respective cells of said serial data stream, a mechanism for locating said boundaries of respective bytes of said incoming serial data stream comprising:
    a counter that is operative to count respective clock signals associated with said incoming serial data stream; and
    a synchronization signal derivation unit, coupled to said counter and being operative to generate an output signal in potential alignment with the boundary of a byte of said incoming serial data stream, in response to contents of said counter reaching a prescribed count value, and iteratively shifting, the time at which said output signal is produced relative to the counting operation of said counter, until said output signal is aligned with said boundary of a byte of said incoming serial data stream.

2. The mechanism according to claim 1, wherein said counter is operative to repetitively count toward said prescribed count value from a first preloaded count value, and wherein said synchronization signal derivation unit is operative to controllably program said counter with a second preloaded count value, different from said first preloaded count value, based upon whether or not said output signal is aligned with said boundary of a byte of said incoming serial data stream.

3. The mechanism according to claim 2, wherein said synchronization signal derivation unit is operative to iteratively program said counter with said second count value for an individual one or more count cycles, separated from one another by plural count cycles during which said counter is programmed to count from said first preloaded count value, until said output signal is aligned with said boundary of a byte of said incoming serial data stream.

4. The mechanism according to claim 1, wherein said counter is operative to generate an intermediate frame sync signal FS0 in response to contents thereof reaching a prescribed count value, and wherein said synchronization signal derivation unit includes a shift register to which said intermediate frame sync signal FS0 is serially shifted, and wherein said output signal is derived from a selected stage of said shift register.

5. The mechanism according to claim 4, wherein said synchronization signal derivation unit is operative to controllably change the stage of said shift register from which said output signal is derived in a manner that causes said output signal to be aligned with said boundary of a byte of said incoming serial data stream.

6. The mechanism according to claim 5, wherein said synchronization signal derivation unit is operative to iteratively and successively change the stage of said shift register from which said output signal is derived over successive intervals, until said output signal is aligned with said boundary of a byte of said incoming serial data stream.

7. A method for locating boundaries of respective bytes of an incoming serial data stream coupled to a receiver of a digital communication system, said receiver having a cell delineation mechanism that is operative, given knowledge of said boundaries of said respective bytes of said incoming serial data stream, to delineate respective cells of said serial data stream, said method comprising the steps of:
    (a) counting respective clock signals associated with said incoming serial data stream;
    (b) in response to the number of clock signals counted in step (a) reaching a prescribed count value, generating an output signal in potential alignment with the boundary of a byte of said incoming serial data stream; and
    (c) iteratively adjusting the time at which said output signal is produced in step (b) relative to the counting operation carried out in step (a), until said output signal is aligned with said boundary of a byte of said incoming serial data stream.

8. The method according to claim 7, wherein step (a) comprises repetitively counting toward said prescribed count value from a first count value, and wherein step (c) comprises controllably changing said first count value to a second count value, based upon whether or not said output signal is aligned with said boundary of a byte of said incoming serial data stream.

9. The method according to claim 8, wherein step (c) comprises iteratively causing step (a) to start counting from said second count value for an individual one or more count cycles, separated from one another by plural count cycles during which step (a) counts from said first count value, until said output signal is aligned with said boundary of a byte of said incoming serial data stream.

10. The method according to claim 7, wherein step (a) comprises generating an intermediate frame sync signal FS0 in response to counting prescribed number of clock signals, said intermediate frame sync signal FS0 being shifted through a multi-stage shift register, step (b) comprises deriving said output signal from a selected stage of said shift register, and wherein step (c) comprises controllably changing the stage of said shift register from which said output signal is derived in a manner that causes said output signal to be aligned with said boundary of a byte of said incoming serial data stream.

11. The method according to claim 10, wherein step (c) comprises iteratively and successively changing the stage of said shift register from which said output signal is derived over successive intervals, until said output signal is aligned with said boundary of a byte of said incoming serial data stream.

12. A method of identifying initial bits within respective bytes of an incoming asynchronous transfer mode (ATM) data stream that is coupled to a receiver of a digital communication system, said receiver having a cell delineation mechanism that is operative, given knowledge of the locations of said initial bits, to delineate respective cells of said ATM data stream, said method comprising the steps of:
 (a) counting respective clock signals associated with respective bits of said incoming ATM data stream;
 (b) in response to the number of clock signals counted in step (a) reaching a prescribed count value, generating an output signal in potential alignment with a first bit of a byte of said incoming ATM data stream; and
 (c) iteratively shifting in a bit-wise manner, the bit time at which said output signal is produced in step (b) relative to the counting operation carried out in step (a), until said output signal is aligned with a first bit of a byte of said incoming ATM data stream.

13. The method according to claim 12, wherein step (a) comprises repetitively counting toward said prescribed count value from a first count value, and wherein step (c) comprises controllably changing said first count value to a second count value, based upon whether or not said output signal is aligned with said first bit of a byte of said incoming ATM data stream.

14. The method according to claim 13, wherein step (c) comprises iteratively causing step (a) to start counting from said second count value for an individual one or more count cycles, separated from one another by plural count cycles during which step (a) counts from said first count value, until said output signal is aligned with said first bit of a byte of said incoming ATM data stream.

15. The method according to claim 14, wherein step (a) comprises generating an intermediate frame sync signal FS0 in response to counting prescribed number of clock signals, said intermediate frame sync signal FS0 being shifted through a multi-stage shift register, step (b) comprises deriving said output signal from a selected stage of said shift register, and wherein step (a) comprises controllably changing the stage of said shift register from which said output signal is derived in a manner that causes said output signal to be aligned with said first bit of a byte of said incoming ATM data stream.

16. The method according to claim 15, wherein step (c) comprises iteratively and successively changing the stage of said shift register from which said output signal is derived over successive intervals, until said output signal is aligned with said first bit of a byte of said incoming ATM data stream.

* * * * *

UNITED STATES PATENT AND TRADEMARK OFFICE
CERTIFICATE OF CORRECTION

PATENT NO. : 7,103,049 B2
APPLICATION NO. : 10/040153
DATED : September 5, 2006
INVENTOR(S) : Jonathan Aaron Wright and Christopher A. Otto It is certified that error appears in the above-identified patent and that said Letters Patent is hereby corrected as shown below:

Column 4, Line 53    Delete: "may occur very"
                     Insert: --may occur every--

Column 5, Line 11    Delete: "in order the for logic"
                     Insert: --in order for the logic--

Column 10, Line 15   Delete: "and wherein step (a) comprises"
                     Insert: --and wherein step (c) comprises--

Signed and Sealed this

Nineteenth Day of December, 2006

JON W. DUDAS
*Director of the United States Patent and Trademark Office*